Sept. 28, 1971    J. J. GILBERT    3,608,428
SPIRAL GROOVE CUTTING APPARATUS
Filed March 4, 1970    5 Sheets-Sheet 1
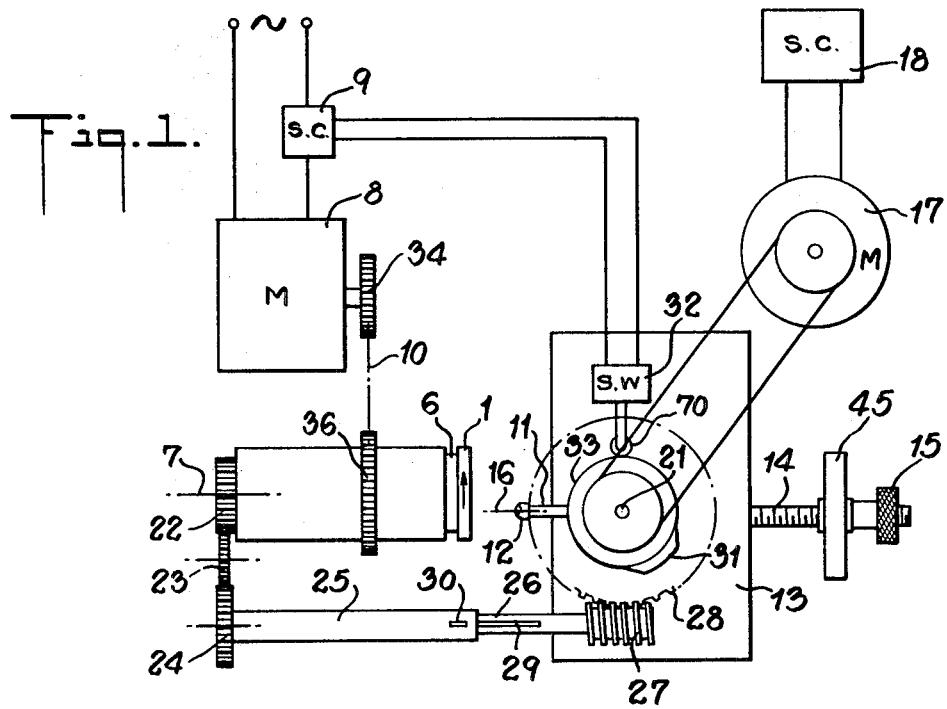
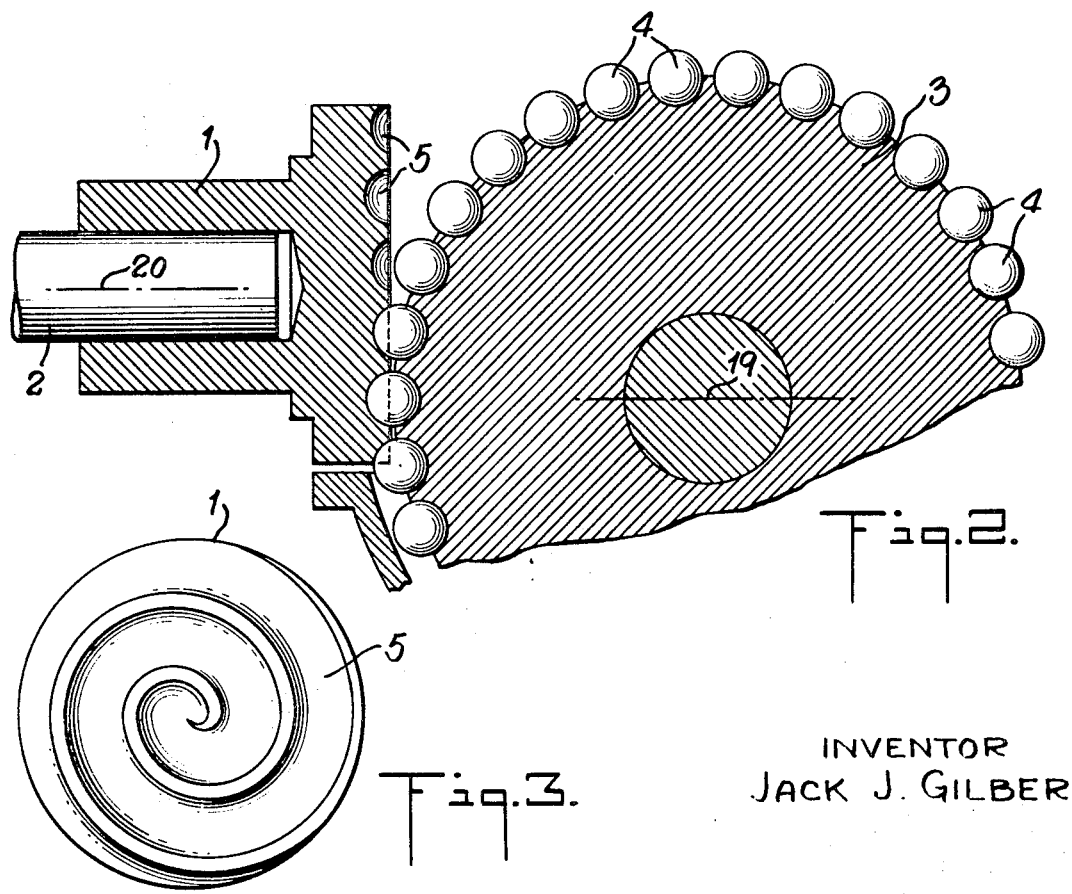
INVENTOR
JACK J. GILBERT

INVENTOR
JACK J. GILBERT

Sept. 28, 1971  J. J. GILBERT  3,608,428
SPIRAL GROOVE CUTTING APPARATUS
Filed March 4, 1970  5 Sheets-Sheet 3

INVENTOR
JACK J. GILBERT

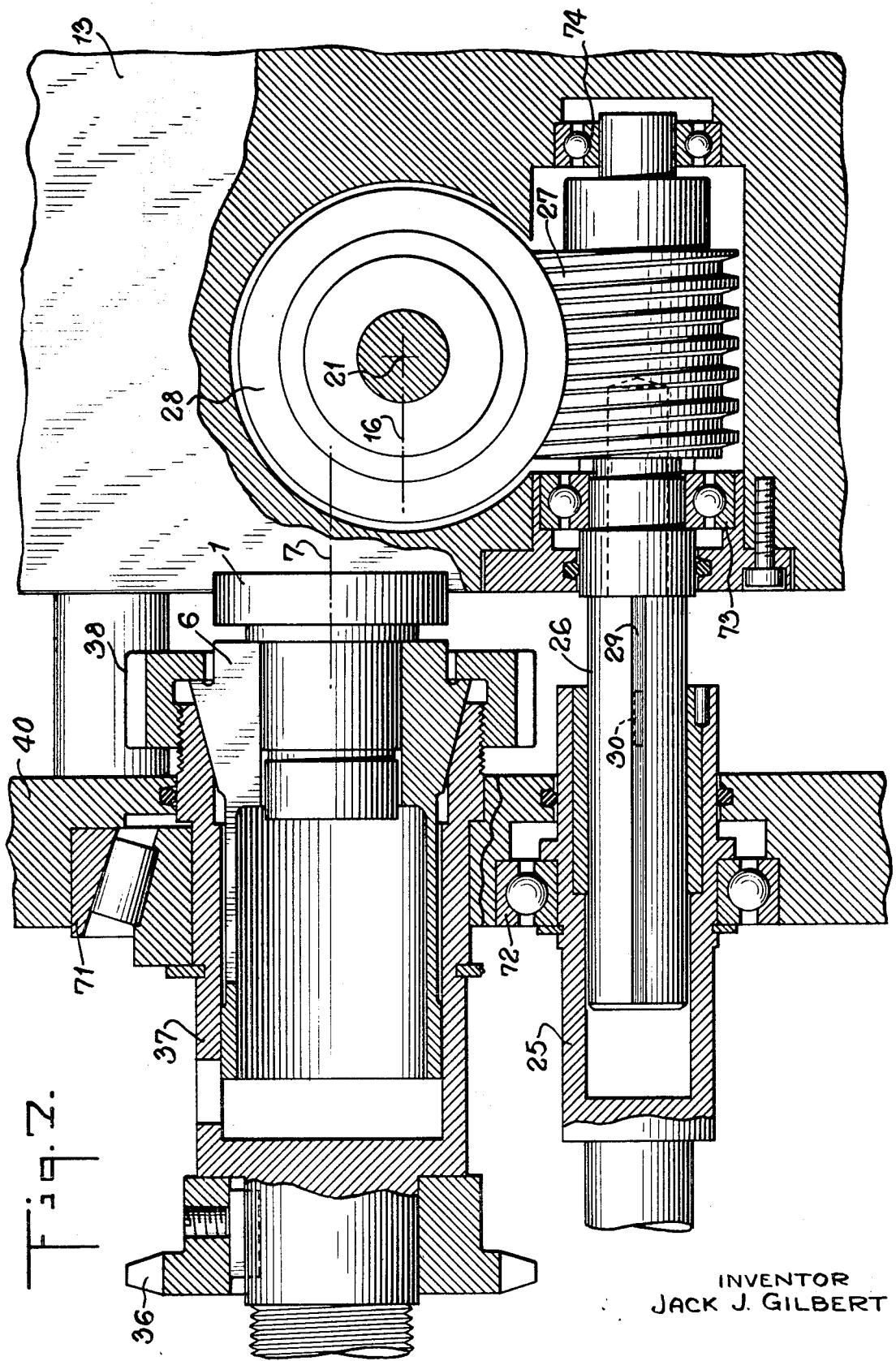

United States Patent Office 3,608,428
Patented Sept. 28, 1971

3,608,428
SPIRAL GROOVE CUTTING APPARATUS
Jack J. Gilbert, Suffern, N.Y., assignor to Spyro
Dynamics Corporation, Northvale, N.J.
Filed Mar. 4, 1970, Ser. No. 16,488
Int. Cl. B23f *1/06;* B23c *3/28*
U.S. Cl. 90—3
7 Claims

ABSTRACT OF THE DISCLOSURE

Apparatus for cutting a spiral groove of arcuate cross-section and varying in depth in accordance with a predetermined radius in a face gear blank comprising means for holding and rotating the blank, means for holding and rotating a cutting tool having an arcuate face around its own axis while turning it about an axis perpendicular thereto at a rate synchronized with the rotation of said blank and means for moving the tool into engagement with said blank.

---

This invention relates to apparatus for cutting a spiral groove of variable depth in an article, such as a face gear.

In my copending application Ser. No. 843,133 filed July 18, 1969, there is described a right angle drive comprising a ball-toothed gear driven by a face gear having a spiral groove, arcuate in cross-section, in the face thereof for receiving the ball teeth. Although, as pointed out in said application, the spiral groove may have a constant depth, such a groove being simple to manufacture, it is preferred to have a spiral groove the depth of which varies in accordance with the radius of the ball-toothed gear. Heretofore, no simple apparatus for the manufacture of such a groove has been available.

The apparatus of the invention, which is simple in construction and readily adjustable, permits rapid cutting of the required face gear groove for driving ball-toothed gears of various sizes. The apparatus comprises means for holding and rotating a face gear blank and means for holding and rotating a cutting tool having an arcuate face around its own axis and for turning the tool around an axis perpendicular to said axis of the tool in synchronism with the rotation of the face gear blank. The face of the tool has a radius substantially equal to the radius of the ball teeth of the gear with which the face gear is to be used and the tip of the tool has a spacing with respect to the turning axis substantially equal to the radius of the periphery of the ball-toothed gear with which the face gear is to be used. Means are provided for manually or automatically advancing the tool toward the face gear blank in steps and preferably, means are provided for turning the tool around said turning axis relatively slowly while it is in engagement with said blank and turning the tool around said turning axis relatively rapidly when the tool is out of engagement with said blank.

The presently preferred embodiment of the apparatus of the invention is illustrated in the accompanying drawings in which:

FIG. 1 is a schematic diagram illustrating the principles of the invention;

FIG. 2 is an enlarged fragmentary side elevation view, partly in cross-section, of a right angle drive, the face gear of which may be manufactured by the apparatus of the invention;

FIG. 3 is an end elevation view of the face gear shown in FIG. 2;

Figure 4:
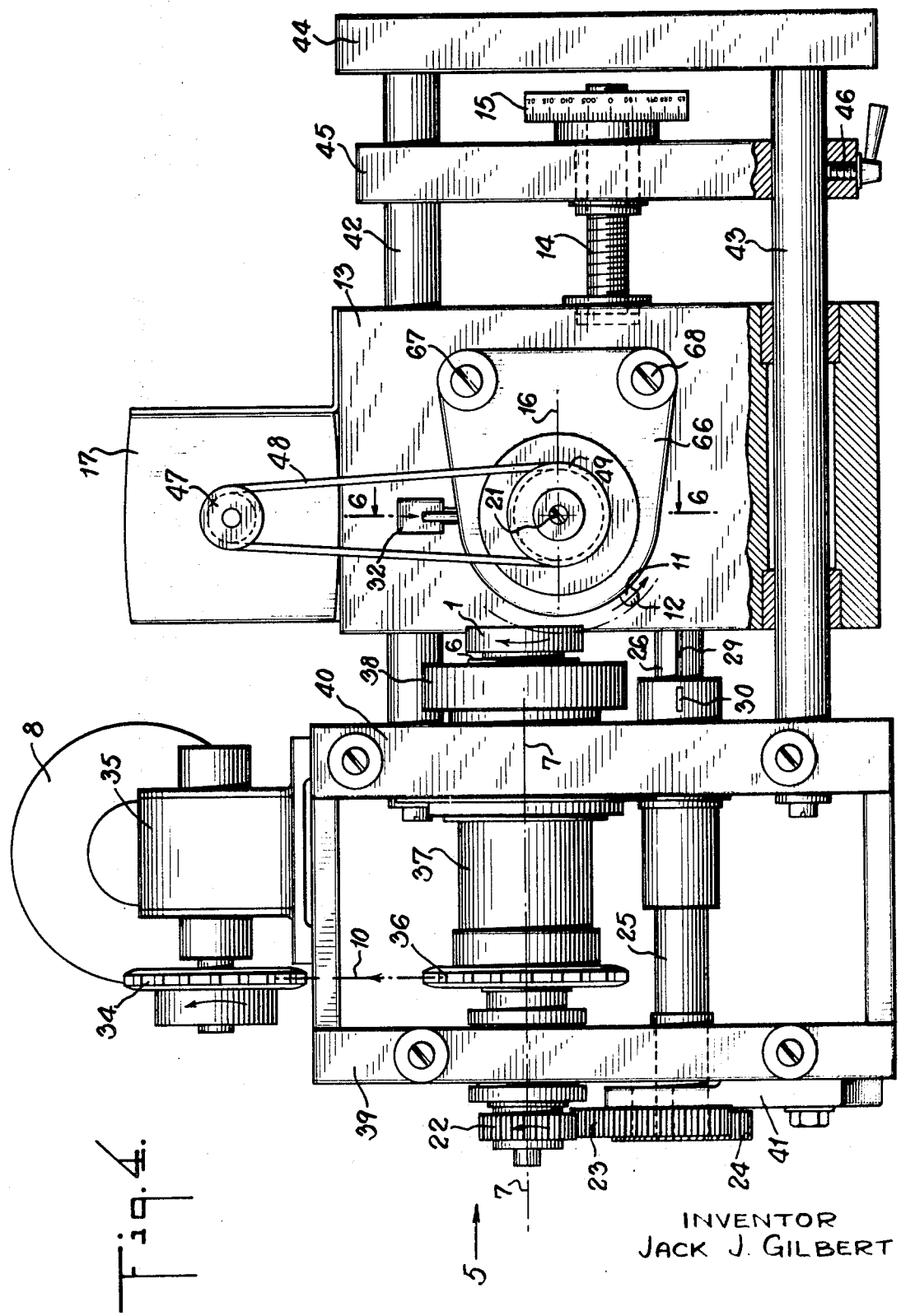
FIG. 4 is a plan view of the presently preferred embodiment of the apparatus of the invention.
Figure 5:
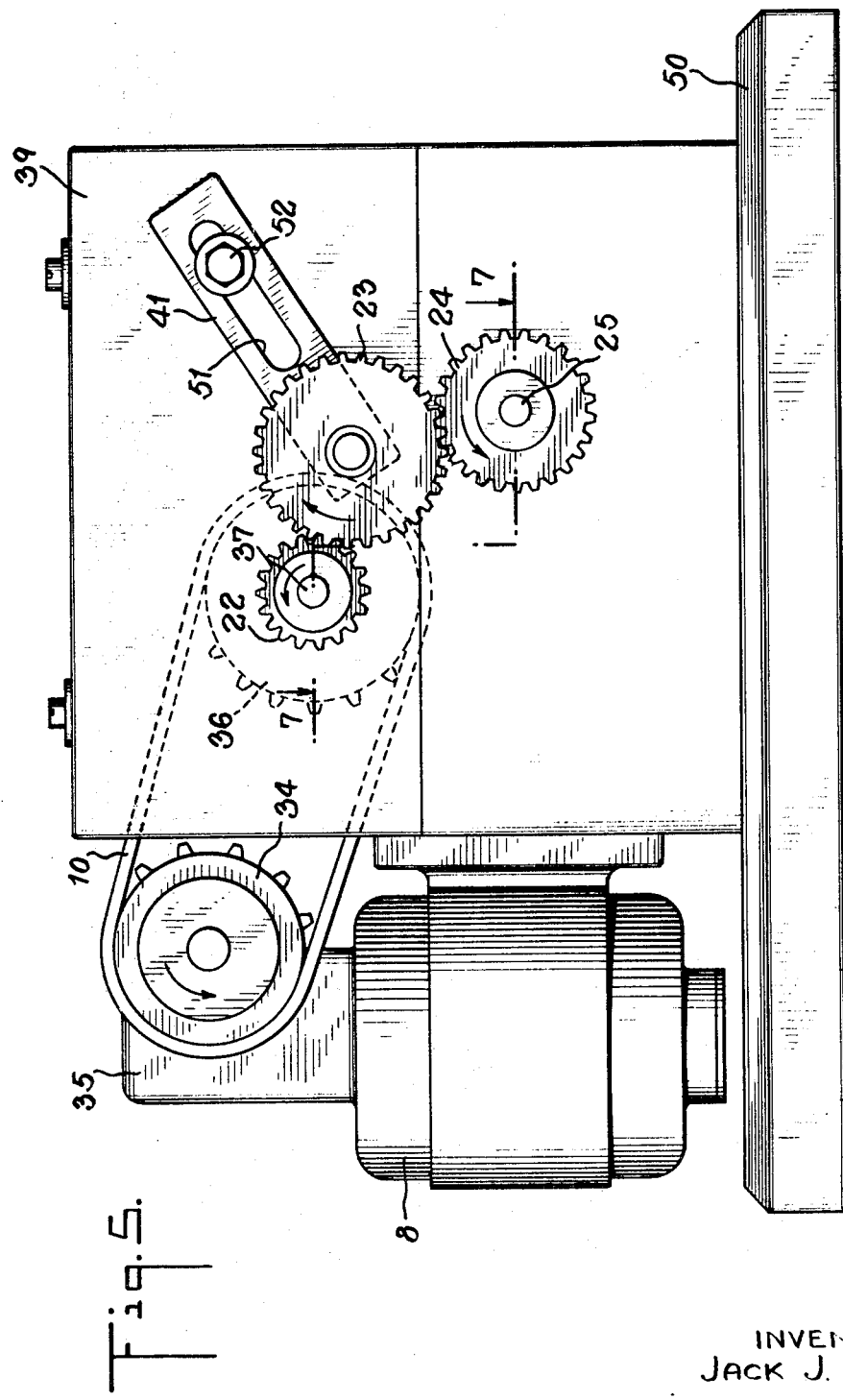
FIG. 5 is an end elevation view of the apparatus shown in FIG. 4 taken from the end indicated by the arrow 5 shown in FIG. 4.
Figure 6:
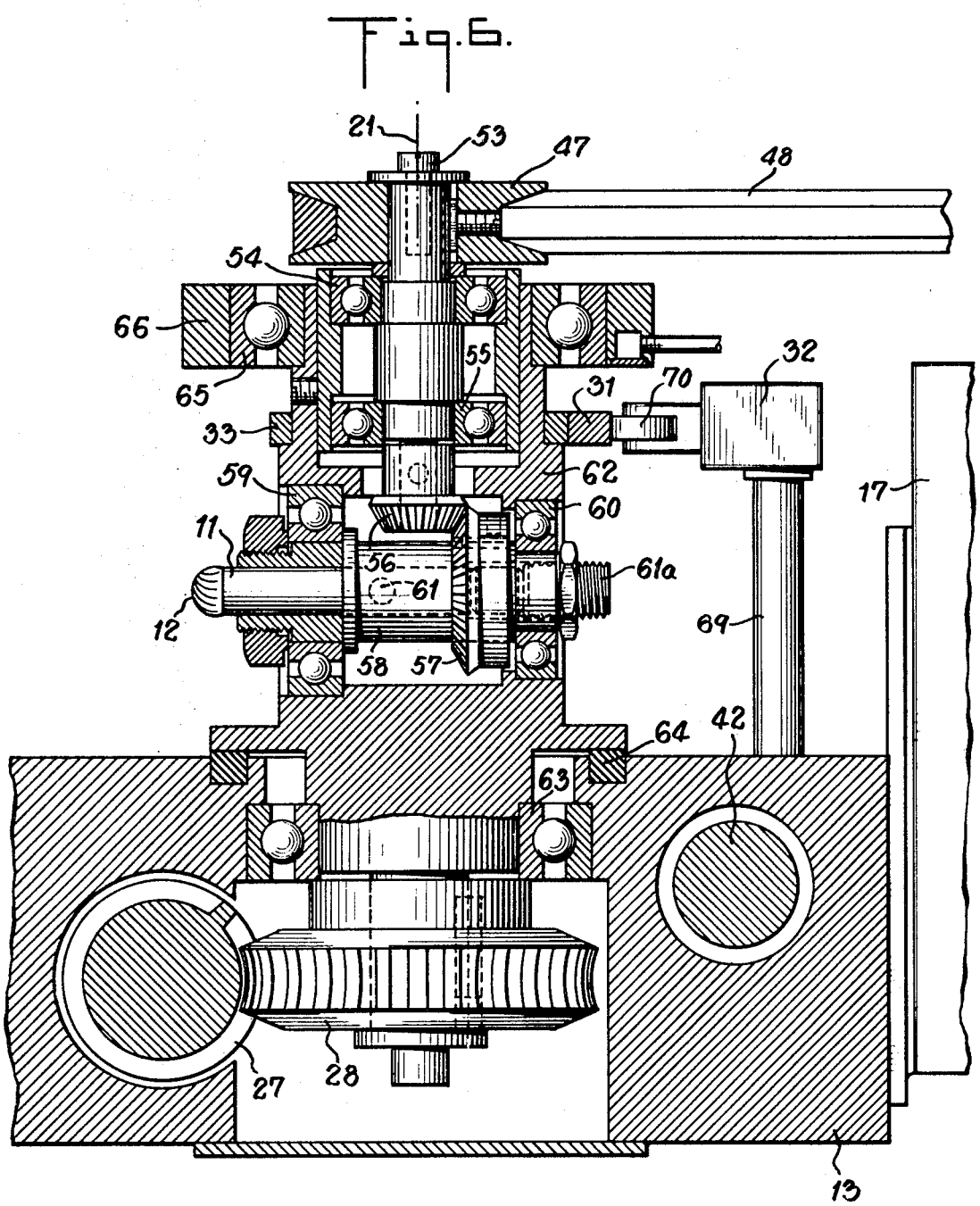

FIG. 6 is an enlarged, end elevation, cross-sectional view of the cutting tool mounting and driving portion of the apparatus shown in FIGS. 4 and 5 and is taken along the line 6—6 indicated in FIG. 4; and FIG. 7 is an enlarged, plan, cross-sectional view of a portion of the apparatus shown in FIGS. 4–6 and is taken along the line 7—7 indicated in FIG. 5.

Referring first to FIGS. 2 and 3, these figures illustrate a portion of the right angle drive illustrated and described in greater detail in the above-identified copending application. The drive includes a driving face gear 1 mounted on a driving shaft 2 and a ball-toothed driven gear 3 having a plurality of spherical ball teeth 4 mounted on the periphery of the gear body. The balls 4 are received in a spiral groove 5 in the face gear 1, and it is such spiral groove 5 that the apparatus of the invention is intended to produce. It will be noted that the spiral groove 5 not only spirals outwardly in a regular spiral from the axis of the face gear 1 but also is of arcuate cross-section and of variable depth. The radius of the cross-section of the groove 5 is substantially equal to the radius of the balls 4 and the depth of the groove 5 varies in accordance with the radius of the outer periphery of the balls 4.

Referring now to FIG. 1 which illustrates schematically the principles of operation of the apparatus of the invention, the blank for the face gear 1 is mounted in a collet 6 of a conventional type employed in lathes and other machines and which is rotatable around an axis 7 by a variable speed motor 8. The speed of the motor 8 is controlled by a conventional motor speed control device 9 and the motor 8 drives the mounting for the collet 6 by way of a chain 10.

A cutting tool 11 having an arcuate face 12, the radius thereof being substantially equal to the radius of the cross-section of the spiral groove 5, is mounted on a support or table 13 which is adjustable toward and away from the face gear blank 1 by means of a micrometer screw and nut arrangement 14 and 15 and is rotatable at a relative high speed about its own axis 16 by means of a motor 17 which may be controllable in speed by a conventional motor speed control device 18.

From FIG. 2, it will be observed that the axis of rotation 19 of the ball toothed gear 4 is offset with respect to the axis of rotation 20 of the face gear 1. From FIG. 1 it will be observed that the axis of rotation 16 of the cutting tool 11 is correspondingly displaced from the axis of rotation 7 of the collet 6 and hence, of the face gear blank 1. The cutting tool 11 may also be turned about an axis 21 which corresponds to the axis of rotation 19 of the ball toothed gear 3 and the spacing of the face 12 of the cutting tool 11 from such axis 21 is substantially equal to the radial dimension between the axis of rotation 19 and the outer periphery of the balls 4.

The cutting tool 11 is turned around the axis 21 in synchronism with the rotation of the collet 6 by means of a gear train comprising the driving gear 22, an idler gear 23 and a driven gear 24, the latter being mounted on a hollow shaft 25 which receives a shaft 26 slidable longitudinally of the axis thereof within the hollow shaft 25. The gear train for turning the cutting tool 11 about the axis 21 also comprises a worm 27 rotatable with the shaft 26 and the worm gear 28. The shaft 26 has a keyway 29 which receives a key 30 mounted on the hollow shaft 25.

The cutting tool 11 is movable into engagement with the face of the face gear blank 1 by means of the screw and nut arrangement 14 and 15. Since it is generally not possible to cut the groove 5 to the desired depth in a single pass of the cutting tool 11 across the face of the blank 1, the groove 5 is generally formed using a series of small cuts or penetrations into the face of the blank 1. While the tool 11 is in engagement with the material of the blank 1, it is desirable that it be moved relatively slowly across the face of the blank 1. Although the speed of turning of the cutting tool 11 around the axis 21 may be maintained constant, and hence, at the relatively slow speed required when the cutting tool is in engagement with the material of the blank 1, it is unnecessary to turn the cutting tool 11 around the axis 21 relatively slowly when the cutting tool 11 is not in engagement with the material of the blank 1. Accordingly, in the preferred embodiment of the invention, the cutting tool 11 is turned around the axis 21 slowly when it is in engagement with the material of the blank 1 but is turned around the axis 21 relatively rapidly when it is free of engagement with the blank 1.

In order to accomplish the different rates of turning of the cutting tool 11 around the axis 21, the mounting for the cutting tool 11 is provided with a cam having a rise 31 which, when it engages the switch 32, causes the motor 8 to increase its speed of rotation. When the switch 32 is in contact with the portion 33 of the cam as illustrated in FIG. 1, the speed of the motor 8 is relatively slow, and the position of the rise 31 in the cam is adjusted so that the collet 6 rotates relatively slowly and the cutting tool 11 turns relatively slowly around the axis 21 when the cutting tool 11 is in engagement with the blank 1 and the collet 6 rotates rapidly and the tool 11 turns rapidly around the axis 21 when the tool 11 is out of engagement with the blank 1.

From the foregoing, it is apparent that the cutting tool 11 rotates about its own axis at a relatively high speed and simultaneously turns about the axis 21 which is perpendicular to the axis of the tool 11 and substantially parallel to the face of the blank 1. When the tool 11 is in a position to engage the face of the blank 1, the collet 6, and hence, the blank 1 rotates relatively slowly and the tool 11 turns around the axis 21 relatively slowly. However, when the tool 11 is in a position where it is out of engagement with the blank 1, the collet 6 rotates, and the tool 11 turns, relatively rapidly.

The tool 11 is brought into engagement with the face of the blank 1 by means of the screw and nut arrangement 14, 15 and between passes of the tool 11 across the face of the blank 1, the tool 11 is advanced into the blank 1 in small increments by means of such screw and nut arrangement 14, 15. In this way, a spiral groove 5 is eventually cut in the face of the blank 1 which groove 5 will have a cross-sectional shape and depth which will mate with the balls 4 of the gear 3 illustrated in FIG. 2.

FIGS. 4–7 illustrate the presently preferred embodiment of the apparatus of the invention. FIG. 4, which is a plan view of the apparatus, shows the motor 8 drivingly connected to a sprocket 34 through a right angle drive 35, the sprocket 34 driving the sprocket 36 through the chain 10. The sprocket 36 is mounted on a tubular shaft 37 which carries the collet 6 having a clamping nut 38. The shaft 37 is rotatably mounted in a pair of supports 39 and 40 and carries the driving gear 22. The gear 22 drives the idler gear 23 which is rotatably mounted on an adjustable arm 41 and the gear 23 engages and drives the gear 24 mounted on the shaft 25 which is also rotatably mounted in the supports 39 and 40.

The support or table 13 is slidably mounted on a pair of rods 42 and 43 which, at one end, are secured to the support 40 and which, at the opposite end, are secured to a support 44.

A cross bar 45 is also slidably mounted on the rods 42 and 43 but may be held in fixed relation thereto by means of the screw 46. The micrometer nut 15 is rotatably mounted on the cross bar 45 and engages the micrometer screw 14 which is fixedly secured at the left end thereof, as viewed in FIG. 4, to the table 13. Accordingly, when the cross bar 45 is held in a fixed position on the rods 42 and 43 by means of the screw 46, rotation of the micrometer nut 15 causes the table 13 to move either toward or away from the blank 1 depending upon the direction of rotation of the nut 15. Thus, the table 13, and hence, the cutting tool 11, may be moved toward and away from the blank 1 by manual rotation of the nut 15, and it will, of course, be apparent to those skilled in the art that the movement of the table 13 may be controlled manually or controlled automatically in any conventional manner.

The motor 17 is mounted at one side of the table 13 and drives a pulley 47 which, by way of the belt 48 drives a pulley 49 which, through a gear train hereafter described in connection with FIG. 6, rotates the cutting tool 11 around its own axis. It will be observed from FIG. 4 that the turning axis 21 is co-axial with the axis of rotation of the pulley 49, is substantially parallel to the face of the blank 1 and is substantially perpendicular the axis of rotation of the cutting tool 11.

FIG. 5, which is an end elevation view of the apparatus shown in FIG. 4 and is taken from the end indicated by the arrow 5 in FIG. 4, illustrates the gear train intermediate the shaft 37 and the shaft 25. It will be seen from FIG. 5 that the support 39 is mounted on a base 50 which also supports the support 40 and the end support 44 (FIG. 4) and that the arm 41 which carries the idler gear 23 has a slot 51 therein permitting adjustment of the idler gear 23 toward and away from the driving and driven gears 22 and 24. The arm 41 is held in position by a bolt 52 threaded into the support 39. Such mounting of the idler gear 23 permits changing of the ratio of the rotation speeds of the shafts 25 and 37 and hence, the speed of turning of the tool 11 around the axis 21 in relation to the speed of rotation of the blank 1 for purposes hereinafter described. Thus, by changing the size of the gear 24 and if desired, the size of the gear 23, it is possible to change such ratios without changing the gear 22.

FIG. 6, which is an end elevation view of the mounting and drive for the cutting tool 11 and is taken along the line 6—6 indicated in FIG. 4, shows the details of the mounting and drive apparatus for the cutting tool 11. As shown in FIG. 6, the pulley 47 drives a shaft 53 which is mounted on a pair of ball bearings 54 and 55 and which carries a bevel gear 56. The bevel gear 56 engages and drives a bevel gear 57 which, in turn, drives a shaft 58 which is mounted on ball bearings 59 and 60 and which receives the cutting tool 11 therein. The cutting tool 11 is held within the shaft 58 by means of a set screw 61 and is adjustable in the direction of its axis by a screw 61a.

The cutting tool drive just described is substantially contained by a hollow shaft 62 which is rotatably mounted near the lower end thereof on the table 13 by means of a ball bearing 63. The shaft 62 is also supported from the table 13 by a bearing 64. The shaft 62 is rotatably supported near its upper end by a ball bearing 65 mounted in a support 66 which is supported from the table 13 by a pair of rods 67 and 68 (FIG. 4). The worm gear 28 is secured to the lower end of the shaft 62 so that the shaft 62 rotates with the worm gear 28, the worm gear 28 being driven by the worm 27.

Thus, it will be seen from FIG. 6 that the cutting tool 11 may be rotated about its own axis by the motor 17 at a relatively high speed whereas the shaft 62 may be rotated at a different speed by the worm gear 28 so as to turn the cutting tool around the axis 21 while the cutting tool 11 is rotating about its own axis.

The switch 32 used to control the speed of the motor 8 is mounted on a post 69 supported from the table 13 and the actuator 70 thereof is engageable with the cam surfaces 31 and 33 for the purposes heretofore described.

FIG. 7 is a cross-sectional, plan view of the embodiment shown in FIGS. 4–6 and illustrates further details of the apparatus for driving the face gear blank 1 and for turning the cutting tool 11 around the axis 21. As shown in FIG. 7, the collet 6 which holds the face gear blank 1 is received in the shaft 37 and may be clamped to the shaft of the blank 1 by means of the clamping nut 38. The shaft 37 is rotatably supported in the support 40 by means of a conical bearing 71 and the shaft 25 is rotatably supported in the support 40 by a ball bearing 72.

The shaft 26 is rotatably supported in the table 13 by a pair of ball bearings 73 and 74, and due to the key and keyway arrangement 29 and 30, the shaft 26 is continuously driven by the shaft 25 but is permitted to move longitudinally of the axis thereof during movement of the table 13 toward or away from the face gear blank 1.

In operation, a face gear blank 1 of the desired size and material, e.g., steel, is inserted in the collet 6 and clamped therein by means of the clamping nut 38. A cutting tool 11 having a face 12 of dimensions substantially equal to the dimensions of the cross-section of the groove 5 it is desired to produce is inserted in the shaft 58 and the spacing of its face 12 from the axis 21 is adjusted to be equal to the radial dimension of the ball toothed gear with which the face gear 1 is to be used from the axis of rotation thereof to the outer periphery of the ball teeth. The ratio of the gears 22, 23 and 24 and the pitch of the worm 27 are selected so that the ratio of the rate of movement of the blank 1 around the axis 7 to the rate of turning of the tool 11 around the axis 21 when the tool 11 is in engagement with the blank 1, is equal to the number of balls 4 on the ball toothed gear which is to be driven by the face gear 1. For example, if the ball toothed gear has 28 ball teeth, the ratio is 28 to 1 and the cutting tool 11 will move from the innermost portion of the desired spiral groove 5 to the outermost portion thereof as the blank 1 makes one revolution.

After such adjustments have been made and with the cutting tool face 12 spaced from the blank 1, the motors 8 and 17 are started up and the nut 15 is turned so that the table 13 and the cutting tool 11 are advanced toward the face of the blank 1 until the face 12 of the cutting tool engages the face of the blank 1. The cutting tool 11 will then cut into the face of the blank 1 and moves across the face thereof producing a spiral groove 5 having a cross-section determined by the shape of the face of the cutting tool 11 and a depth which varies in accordance with the distance from the axis 21 to the face 12 of the cutting tool 11. When the tool 11 is in engagement with the blank 1, the tool 11 will move relatively slowly across the face of the blank 1 and the rotation speed of the blank 1 will be relatively slow. However, as soon as the cutting tool has made a pass across the face of the blank 1, the switch 32 will be actuated by the cam rise 31 causing the motor 8 to speed up and hence causing both the rotation speed of the blank 1 and the speed of turning of the tool 11 around the axis 21 to speed up until the tool 11 again comes close to the surface of the blank 1. Between the time that the tool 11 leaves the face of the blank 1 and again returns thereto, the table 13 may be advanced by a small amount, e.g., 0.020 inch, toward the blank 1 by rotating the nut 15 thereby causing an increase in the depth of the groove 5. The cycle of operations is repeated until the groove 5 has the desired depth.

From the foregoing, it will be apparent that the apparatus of the invention provides a relatively simple and easily adjustable machine for cutting a complex groove shape in a face gear. Although the invention has been described as being useful for producing a groove having an arcuate cross-section, it will be apparent that grooves of other cross-sectional shape may be readily produced by changing the shape of the face 12 of the cutting tool 11.

What is claimed is:

1. Apparatus for cutting a variable depth, spiral groove in a blank comprising means for holding and rotating said blank, means for mounting and rotating a cutting tool, means for turning said mounting means around an axis substantially parallel to the face of said blank in synchronism with the rotation of said blank and means for moving said mounting means toward said face and thereby engaging said tool with said blank.

2. Apparatus as set forth in claim 1 comprising motor means drivingly connected to both said tool rotating means and said turning means for driving them in synchronism.

3. Apparatus as set forth in claim 2 further comprising means for controlling the speed of said motor including means controlled in accordance with the position of said turning means for varying the rate of turning of said turning means.

4. Apparatus for cutting a spiral groove having a depth varying along an arc in a blank comprising means for holding and rotating said blank around a first axis perpendicular to the face of said blank, said means comprising a motor, means for holding and rotating a cutting tool around a second axis extending parallel to but displaced from said first axis in a predetermined position of said tool, means for turning said tool holding means around a third axis substantially parallel to said face of said blank and substantially perpendicular to said second axis, means drivingly interconnecting said motor and said turning means, and means for advancing said tool holding means toward said face of said blank.

5. Apparatus as set forth in claim 4 further comprising means for controlling the speed of said motor and control means operable by said turning means and connected to said motor speed controlling means for varying the speed of said motor dependent upon the position of said tool holding means relative to said second axis.

6. Apparatus as set forth in claim 5 wherein said control means comprises a cam rotatable with said tool turning means and a switch operable by said cam.

7. Apparatus as set forth in claim 4 wherein said tool holding and rotating means comprises means for engaging said blank and means drivingly interconnecting said engaging means and said motor, said means for holding and rotating said tool comprises means for receiving and engaging said tool and for adjusting said tool in the direction of its axis of rotation and means rotatable about said third axis for driving said tool receiving and engaging means and said means drivingly interconnecting said motor and said tool turning means comprises a gear train intermediate said tool holding and rotating means and said tool turning means.

References Cited

UNITED STATES PATENTS

| 1,243,767 | 10/1917 | Schurr et al. | 90—3 |
| 2,344,323 | 3/1944 | Pelphey | 90—3 |

GIL WEIDENFELD, Primary Examiner

U.S. Cl. X.R.

90—11.4